April 2, 1968 I. ABRAHAMSOHN 3,376,163

PHOTOSENSITIVE CELL

Filed Aug. 11, 1961 3 Sheets-Sheet 1

INVENTOR
ILSE ABRAHAMSOHN

BY *Strauch, Nolan & Neale*

ATTORNEYS

INVENTOR
ILSE ABRAHAMSOHN

Strauch, Nolan & Neale
ATTORNEYS

INVENTOR
ILSE ABRAHAMSOHN

Strauch, Nolan & Neale
ATTORNEYS

United States Patent Office 3,376,163

Patented Apr. 2, 1968

3,376,163

PHOTOSENSITIVE CELL

Ilse Abrahamsohn, Boston, Mass., assignor to Itek Corporation, Lexington, Mass., a corporation of Delaware Filed Aug. 11, 1961, Ser. No. 130,960
5 Claims. (Cl. 136—89)

This invention relates to thin film photosensitive devices, and more particularly to photosensitive devices formed from evaporated thin film layers of semiconductor materials such as cadmium or zinc sulfide, and to methods of manufacture of such devices.

It is well known that pure cadmium sulfide or zinc sulfide or combinations thereof is not a good semiconductor, but the cadmium or zinc sulfides have desirable properties as a light sensitive device only after sensitization by heating in a vacuum or in an atmosphere containing oxygen, or by the presence of impurities in the cadmium sulfide lattice, or both. The construction of photoconductors by vacuum evaporation of cadmium sulfide powder is well known and has been used commercially for a production of photoconductive cells. The thickness of the cadmium sulfide layer employed heretofore has been at least 0.1 mm. or considerably greater, and such cells have been found very satisfactory for many photoconductor applications.

Looking now to the present invention, it has been found that the cadmium sulfide layers may be vacuum evaporated as extremely thin continuous films having a thickness of as little as 5 to 8 microns. After sensitization, such films may have photoconductor properties that compare favorably with the prior art thicker layers. It has also been found that by employing two and even three thin film layers each with different proportions of impurities (and, indeed, with entirely different impurities) so that one layer may contain only a donor impurity and another layer only an acceptor impurity or both a donor and an acceptor impurity it is possible to provide even greater current carrying capacities and a more favorable ratio between the light current and the dark current. Furthermore, such extremely thin film layers are substantially translucent and thereby make the cell substantially equally responsive to light received on either side of it.

It has been proposed to use cadmium sulfide as a solar cell because of its theoretically favorable efficiency at the high cell temperatures (i.e., temperatures ranging from room temperature to 75° C.) experienced by cells exposed to solar radiation. Such cadmium sulfide cells must have a barrier layer to be photovoltaic. The most efficient barrier layer materials for use with cadmium sulfide are apparently compounds including the metal copper. For example, prior art cadmium sulfide photocells have used copper oxide barrier layers formed from copper electroplated at high current density, and oxidized by exposure to air while heating, to produce a black mossy-like coating which absorbed as much as 50% of the light transmitted to the cadmium sulfide body.

In accordance with one of the features of this invention, it has been found that a copper oxide barrier layer may be formed so thin as to be substantially transparent on a cadmium sulfide body by vacuum evaporation. With a transparent copper oxide barrier layer and extremely thin film layers of cadmium sulfide which also are quite translucent and, therefore efficient transmitters of incident radiation, it is possible to produce a cadmium sulfide photovoltaic cell that is a "front wall" cell as well as a "back wall" cell. A "front wall" cell converts light into electrical energy by absorption of the light near the incident surface followed by the diffusion of charge carriers from a barrier near this incident surface (electron-diffusion) whereas in a "back wall" cell light is similarly converted by absorption of near the surface of the cell opposite of the surface upon which the light is incident.

That a solar cell can be produced which is capable of illumination through either the "front wall" or the "back wall" is particularly desirable in non-oriented solar cell systems. For example, as solar cell generators on satellites and similar objects cannot always be oriented to the most favorable position relative to the sun, it is necessary to provide four areas in different planes to assure an electrical output irrespective of the orientation of any one active cell area relative to the position of the sum. By utilizing a solar cell in accordance with the present invention, each cell area will operate in response to solar radiation from either of two opposite directions, thereby reducing by one half the number of solar cell areas necessary. Not only does this reduce the production cost of the system, but it also significantly reduces the weight of this system and, therefore, the cost of placing it beyond the gravitational field of the earth.

It is, accordingly, a major object of the present invention to provide a novel photosensitive device composed of a plurality of thin film layers of cadmium or zinc sulfide with the impurity content of each layer varied to improve the electrical characteristic of the device.

A further object of the invention is to provide, in a photosensitive device, thin substantially translucent film layers of cadmium or zinc sulfide having a thickness on the order of about 10 microns.

Another major object of the invention is to provide a novel photovoltaic cell utilizing film layers of cadmium or zinc sulfide and a barrier layer of copper oxide so thin as to be substantially transparent.

Another major object of the present invention is to provide a novel, thin film, photovoltaic cell capable of being irradiated through either its "front wall" or its "back wall".

A further object of the invention is to provide novel methods of producing photocells having the foregoing characteristics.

These and other objects of the invention will become more fully apparent from the claims, and from the description as it proceeds in connection with the drawings wherein:

Figure 10:
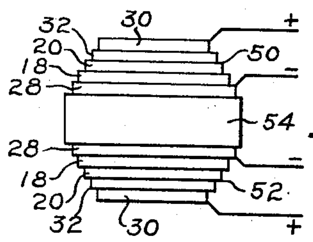
Figure 9:
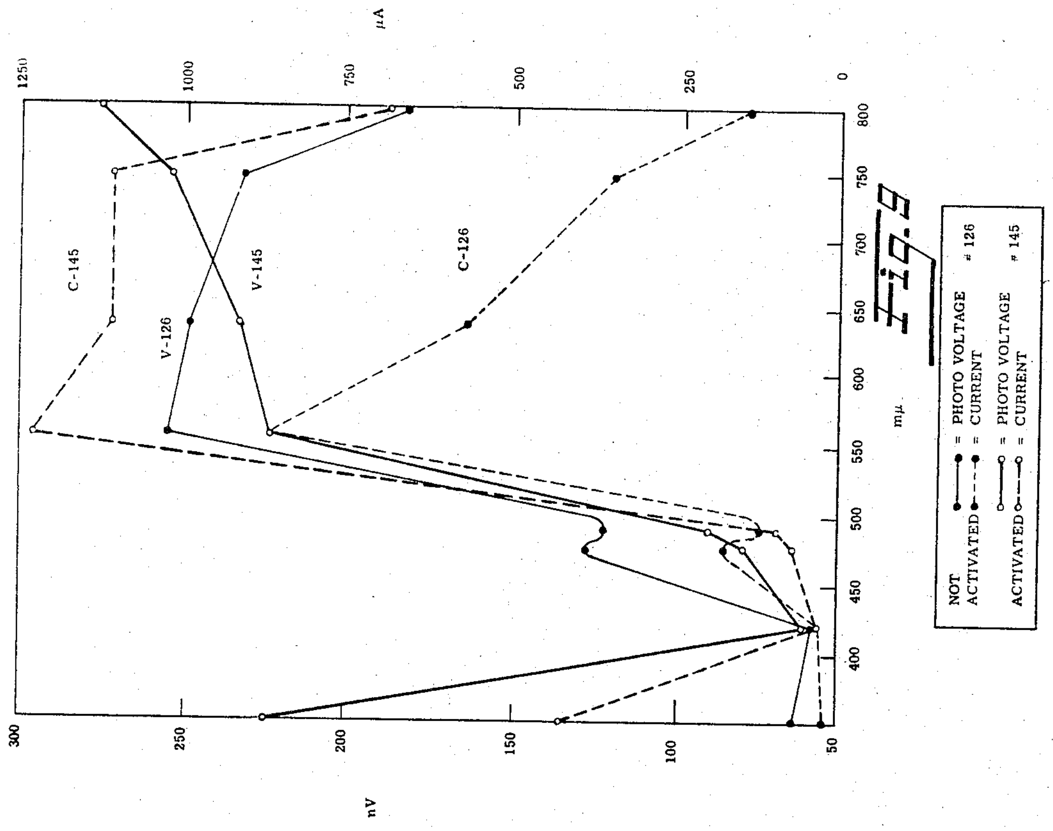

FIGURE 9 is a chart illustrating the spectral response of a typical cadmium sulfide photovoltaic cell constructed in accordance with this invention, separate curves representing cells formed with and without added acceptor impurities, and FIGURE 10 is a side elevation view of a further embodiment of the present invention wherein two photovoltaic cells are applied to opposite sides of a transparent glass substrate.

Figures 1, 4:
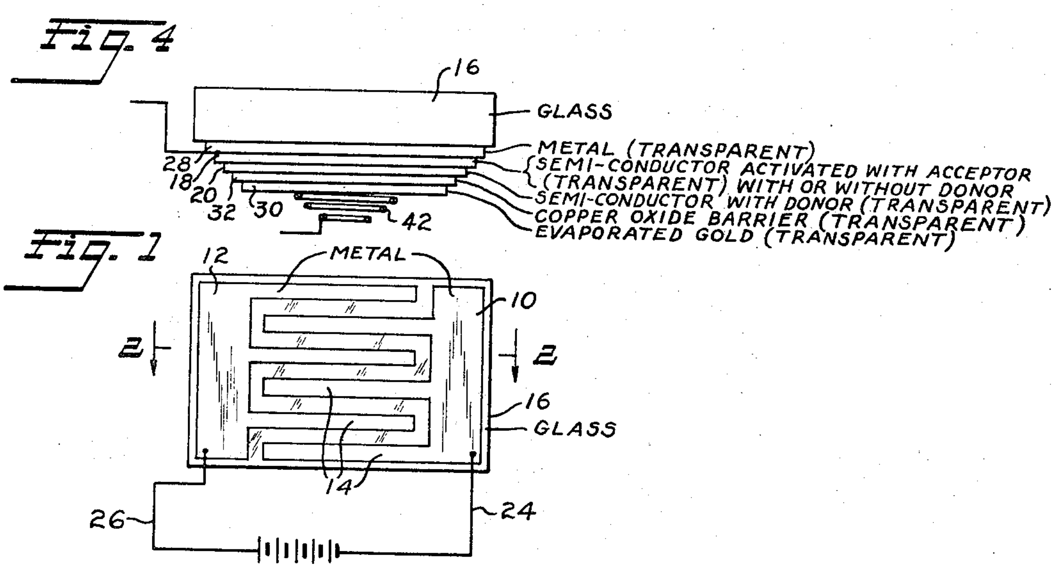
FIGURE 1 is a top plan view of a photoconductive cell in accordance with the present invention.
FIGURE 4 is a side elevation view of a novel photovoltaic cell in accordance with the present invention.

Referring now to FIGURE 1, mounted on one surface of a glass substrate 16 is an electrically conductive comb type electrode comprising a pair of parallel strips 10 and 12 and a plurality of parallel spaced apart feet 14 alternately connected to opposite end strips 10 and 12. Strips 10 and 12, if electrically independent, may serve as two electrodes for the cell or, if electrically connected may serve as one surface electrode.

As in prior photoconductive cells, the electrode is applied as by photoetching, electroplating, melting, painting, thermal deposition by evaporation or a like process onto a glass substrate 16. Or, if substrate 16 is smooth Pyrex, a photoresist coat applied by brush may be used. In the latter process, an exposure time of from ½ to 3 minutes together with slow heating from room temperature to about 200° C. in a period of approximately one hour and equally slow cooling give optimum results against peeling.

After the electrode material is deposited on glass substrate 16, the semiconductor material may be applied by evaporation techniques well known in the art. Cadmium sulfide or zinc sulfide powder or a mixture of cadmium and zinc sulfides, purified, with from about 5% to 15% $CdCl_2$, "reagent," and anhydrous have been conveniently used as the starting material for evaporated layers for photoconductor cells. The $CdCl_2$ reduces the tendency of the CdS layer to peel and provides increased dark and light current conductivity. This later effect is regarded to be caused by the donor impurity $CdCl_2$ replacing a sulfiide ion in the CdS lattice by a chloride ion.

It has also been known heretofore to use cadmium sulfide powder as a starting material, 5% to 12% $CdCl_2$ as a donor impurity and a small amount of copper as an activator and/or acceptor impurity. Conventionally, the copper is mixed with the starting material in the form such as copper chloride, copper acetate or copper sulfate and in quantities of 1% to 5%. The activator-acceptor impurity reduces the dark and light currents and increases the speed of response of the cell.

To deposit an evaporated layer on its electrode surface, substrate 16 is masked and placed in a vacuum system over an evaporation source which may consist of filament spirals filled with the starting material. After a vacuum on the order of $10^{-5}$ to $5\times10^{-6}$ mm. Hg is obtained in the system, the starting material evaporates and then condenses on the electrode surface of substrate 16. After the evaporation is completed, which may take up 30 minutes, substrate 16 is taken out of the vacuum system and heated in an oven for approximately 30 to 45 minutes at a temperature in the range of 500° to 650° C., then allowed to cool in the oven to 200° C. and, finally, taken out of the oven and cooled to room temperature.

It is well known in the art that cadmium or zinc sulfide film layers, after evaporation or sublimation, have high dark currents, and that baking in an atmosphere containing oxygen for at least 10 minutes between temperatures of 250° C. and 650° C. reduces the dark current resistivity by several orders of magnitude. Where excess cadmium is present, it has been determined that during baking at temperatures in excess of 550°, interstitial cadmium forms.

Typical values of dark and light (50 footcandles) current with 22.5 volts applied after sensitization in prior art CdS cells were about $0.3\times10^{-6}$ amps and 0.1 amp respectively for a cell area of 8 x 10 mm., thus giving a "delta" of about $3\times10^5$. "Delta" is defined as the ratio of the difference between the light current and the dark current to the dark current.

As was discussed above, it has been found that cells having more desirable characteristics can be achieved by utilizing multiple evaporated layers or films having the minimum thickness that can be achieved without loss of a continuous surface as two such thin film layers of the semiconductor material give better results than one layer of the same thickness as the two separate film layers combined. Also, with two separate film layers, it has been found advantageous to use different impurities in the starting material for each layer since the "delta" may be increased in this manner.

Figure 2:
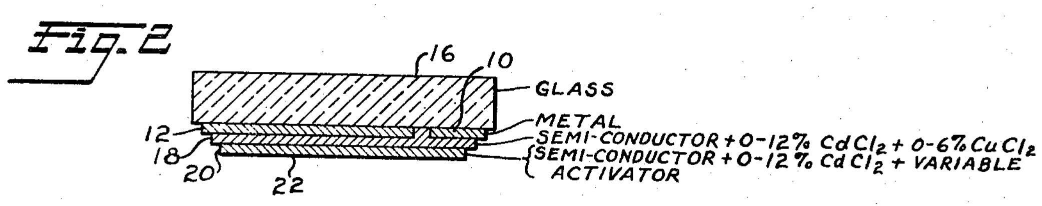
FIGURE 2 is a side elevation view in section taken along lines 2—2 of FIGURE 1.

With reference now to FIGURE 2, after electrodes 10 and 12 are applied to substrate 16, a first layer 18 of CdS may be evaporated onto the electrode using the conventional techniques outlined above, and a starting material composed of CdS powder, purified, 5% to 15% of $CdCl_2$ powder, anhydrous, and 0 to 15% of $CuCl_2$ powder, anhydrous. In one example, the first layer 18 with 12% $CdCl_2$ was evaporated onto the electrode to a thickness of about 5 to 10 microns and sensitized by heating substrate 16 in air to a temperature of about 600° C. followed by slow cooling in the oven with heat turned off until the oven temperature reached 200° C., after which the substrate with the first layer 18 was removed and again placed in the vacuum system where a second layer 20 of CdS was evaporated onto layer 18. Layer 20 also was a thin film having a thickness of about 5 to 10 microns. For the second layer, the starting material was CdS powder purified with 12% $CdCl_2$, either with or without an activator as will be explained below. The second layer was sensitized in the same manner as the first layer.

In photoconductor applications, both layers preferably contain an activator such as copper, silver or manganese, copper being preferred as it diffuses more readily into both cadmium and zinc sulfides. Also, in photoconductor applications, the amount of $CuCl_2$ in the starting material for the second layer may be increased from 5% to 15%, or a thin film of copper metal of several Angstroms thick may be deposited as by evaporation on surface 22 of layer 20 of cadmium sulfide either in lieu of the $CuCl_2$ in the starting material or in addition thereto. This film layer including any copper metal is heated to the temperature of about 6000° C. or higher used for sensitizing the second layer 20. Where copper metal is used to produce layer 20, the copper film is then added on surface 22 before layer 20 is sensitized, and the sensitizing heating causes complete diffusion of the copper into layer 20.

Advantages of such procedure are that each layer is more thoroughly sensitized when heated in air and that the amount of acceptor impurity in the second film 20 may be totally independent of the nature and amount of impurity in the first film 18. As a result the "delta" of the cell above may be substantially increased to values as high as $10^8$.

The following table identifies three representative examples of the cell illustrated in FIGURES 1 and 2 differing only in the amount and type of activator in layer 20. All current measurements (in amperes) were made with a 50 footcandle incandescent light source, a 22.5 volt battery connected between leads 24 and 26 and a cell area of 20 by 30 mm.

| Example | Activator | Dark Current | Light Current | "Delta" |
|---|---|---|---|---|
| 1 | | | | |
| 2 | None | $0.27\times10^{-6}$ | .113 | $4.2\times10^5$ |
| 3 | Cu metal | $0.0012\times10^{-6}$ | .130 | $10.8\times10^7$ |
| --- ----- | 15% Cu Cl and Cu metal. | $0.0058\times10^{-6}$ | .140 | $2.4\times10^7$ |

In Example 3, the 15% $CuCl_2$ was in the starting material and the copper metal layer was evaporated onto the exposed surface of cadmium sulfide layer 20 before the sensitization baking. In all three examples, the starting material for the first layer 18 contained 5% $CuCl_2$ in addition to the 12% CdCl used with the cadmium sulfide powder. The high "delta" obtained in Example 2 above is believed to result from the presence of a substantially greater amount of copper as an activator in layer 20 than is present in layer 18 which is in contact with electrodes 10 and 18.

To produce a photovoltage from the cell of FIGURES 1 and 2, it is necessary to superpose an electrode 30 (see FIGURE 3) on the exposed surface 22 (see FIGURE 2) of film 20 and to provide a barrier layer between surface 22 and the electrode 10, 12 and 14. When the copper metal evaporated onto surface 22 of FIGURE 2 was heated to about 600° C. during the sensitization of film 20, it was found that substantially complete diffusion of the copper into film 20 occurred and that no barrier layer existed. As a result, the photovoltaic voltage detected between electrodes 28 and 30 in the embodiment of the cell illustrated in FIGURE 3 where copper metal was applied and heated during sensitization to temperatures on the order of 600° C. was in the range of 0.5 to 15 millivolts rather than 150 or more millivolts reported for CdS cells made by other techniques such for example, as described in "Photoemission in the Photovoltaic Effect in Cadmium Sulfide Crystals" by Williams and Bube, Journal of Applied Physics, vol. 31, No. 6, pp. 968–978, June 1960.

Electrode 28 need not necessarily have the two separate strips 10 and 12 and the feet 14 as illustrated in FIGURE 1, but may be formed as a continuous layer, preferably sufficiently thin to have a high degree of transparency. With the comb type electrode of FIGURE 1, a light transmissivity of about 50% is obtained. Commercially available conductive glass, i.e. glass with a tin oxide coating, has a light transmissivity of about 90% and thus may be preferred, particularly for applications subject to "back wall" illumination.

Application of electrode 30, which may be a thin film of evaporated gold, to surface 22 of thin film layer 20 resulted in a great reduction in the "delta" in certain samples, apparently because of minute discontinuities or pin holes in the thin film layers 18 and 20 which caused shorting between electrodes 28 and 30. A triple CdS evaporation giving a total three layer thickness of about 25 microns eliminated this reduction in "delta" due to shorting but the cell is more opaque due to the increased thickness. Also, the temperature of substrate 16 was reduced during evaporation of the second and third film layers by increasing the distance between the substrate and the filament in which the CdS starting material was placed. This however, produced no significant increase in the photovoltaic voltage.

Figure 3:
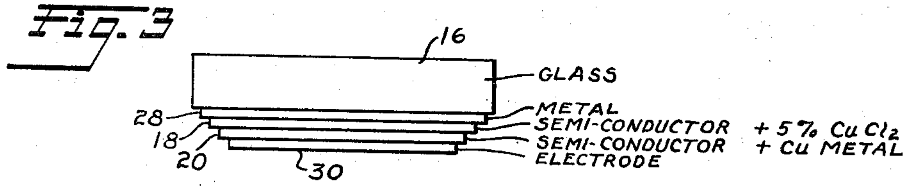
FIGURE 3 is a side elevation view of a further cell construction wherein the semiconductor is sandwiched between two electrodes which are superposed over the cadmium sulfide.

FIGURE 4 illustrates a cell which produces photovoltaic voltages as high as 300 millivolts and which differs from the cell in FIGURE 3 only by the presence of a barrier layer 32 between the outer CdS thin film layer 20 and electrode 30. The exact procedure described above in connection with the cell of FIGURE 3 was used to produce the cell of FIGURE 4 except that after film layer 20 of CdS was evaporated onto thin film layer 18, it was sensitized by heating to about 600° C. in air and allowed to cool prior to the step of evaporating the copper metal to a thickness of only a few Angstroms onto the exposed surface of film 20. After the copper metal was evaporated onto film layer 20 substrate 16 was heated in air, but only to a temperature of about 350° C. (which is slightly below the temperature of complete diffusion of the copper into the CdS film) for about 10 minutes. This formed a copper oxide barrier layer or film 28 which is so thin as to be almost invisible and thus transparent. Then a gold electrode 30 was evaporated onto the surface of film 20. As before, a photovoltaic voltage of several tenths of a volt was produced with illumination of about 500 footcandles.

Several tests were subsequently made to identify the mechanism by which the photovaltaic response is generated in thin film layers. When electrode 30 was omitted, no photovoltaic response was detected. When electrode 28 was made sufficiently thick to be opaque, the photocell could be illuminated only through the barrier layer, but the expected photoinduced output voltage was obtained.

Figure 5:
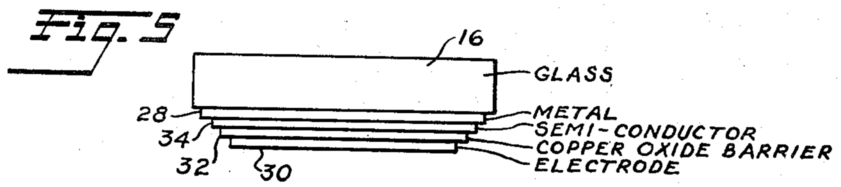
FIGURE 5 is a side elevation view of an embodiment of a photovoltaic cell having only a single translucent film layer of cadmium sulfide.

A photoinduced voltage was obtained in samples where films 18 and 20 were evaporated from a starting material of pure CdS and CdS with addition of $CdCl_2$ in the ranges discussed above (i.e., several tenths of a volt with an illumination of about 500 footcandles). A photoinduced voltage was also obtained with the construction illustrated in FIGURE 5 where only a single film layer 34 of CdS, either with or without $CuCl_2$ as an activator in the CdS powder, was used as a starting material. The primary disadvantage of the cell construction shown in FIGURE 5 is that with a thin film layer, a thickness of 10 or more microns is necessary to prevent "pin holes" from appearing and electrically shorting electrodes 28 and 30. The thicker single film layer has the disadvantage that the sensitization by heating is not as uniform as in the case of the inner film layers. The simplicity and decreased time for manufacture are advantages in favor of use of a single layer, and its use is desirable for certain applications.

Figure 6:
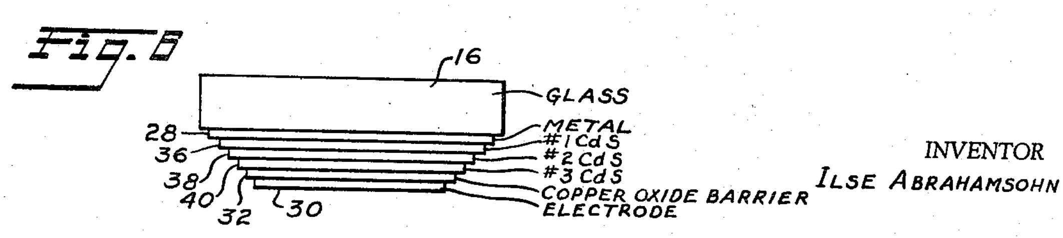
FIGURE 6 is a side elevation view of a further embodiment of a photovoltaic cell having three translucent film layers of cadmium sulfide.

Thicker films composed of three separately sensitized films 36, 38 and 40, each about 5 to 10 microns thick, as shown in FIGURE 6, may also be used. The $CdCl_2$ in the several film layer #1CdS, #2CdS and #3CdS was varied as to which film or films it was used in, and little, if any, advantage of three film layers as compared with the results obtained by a two film layer illustrated in FIGURE 4 was found.

Experimental cells were made and tested where all three film layers 36, 38 and 40 had no copper activator; where only the middle layer 38 and copper activator introduced as 5% $CuCl_2$ in the starting material; where only film layers 36, 38 and 40 had $CuCl_2$ in the starting material. All of these cells produced the expected photovoltaic output, through with some variation in wave length response, maximum voltage and maximum short circuit current output.

Many samples of the two layer cell of FIGURE 4, were made where the starting material for each layer 18 and 20 was varied. Generally good photovoltaic outputs uniformly were present. In one preferred type of cell, CdS powder with 12% $CdCl_2$ and 5% $CuCl_2$ was used as the starting material for film 18 and the CdS powder with only 12% $CdCl_2$ as the starting material for film 20. Each film was individually baked in air (or preferably in an atmosphere with a slightly reduced oxygen content to prevent over oxidation) at about 600° C. for 45 minutes, cooled slowly to 200° C. and returned to the vacuum system. A thin copper layer a few Angstroms thick was then vacum deposited onto the outer CdS layer 20 and the plate was baked in air at 350° to 400° for 15 minutes. The last step formed a *transparent* copper oxide barrier layer 32. The cell was then completed by vacuum depositing a thin transparent metal film electrode 30 such as gold, siliver, platinum or the like over the copper oxide layer. It was found that a fold film 30 having a resistance of about 300 ohms/sq./mm. provides a good compromise between the need for an electrode having high light transmissivity and a low resistance. Pressure applied on electrode 30 as by mechanically forcing a screen against the electrode or by a spiral 42 of a thin resilient material having a conductive surface against electrode 30 has been found to reduce the internal electrical resistance of some cells having low electrical outputs. Electrode 30 may also be applied in the form of a screen having narrow strips of metal deposited to a substantial thickness. This type of electrode also has low electrical resistance and high light transmissivity.

Another cell was produced using, in the starting material for the first layer, 6% $CdCl_2$ as the donor impurity and 2.7% $CuCl_2$ as the acceptor impurity and, in the starting material for the second layer 6% $CdCl_2$ as a donor impurity and no acceptor impurity. In still another cell, the same starting materials for the two layers were reversed, providing only the donor impurity in the first layer and both the donor and acceptor impurity in the second layer. Both cells produced satisfactory results.

Where two superposed layers of CdS have identical impuritiy concentrations, it has been found that the cells have poorer electrical and light transmitting characteristics. For example, when both layers were formed from the same starting material containing 6–12% $CdCl_2$ and 2.7–5.4% $CuCl_2$, the general light transmissivity was low as were the short circuit photovoltaic currents. When only the donor impurity (6–12% $CdCl_2$) was used in both layers, the dark current was high and photovoltage low. The compromise of a starting material for the first layer was 2.7% $CuCl_2$ as an acceptor impurity and no donor impurity and a starting material for the second layer with 6% $CdCl_2$ as a donor impurity gave about the best result so far achieved. Adding amounts up to about 6% $CdCl_2$ as a donor impurity in the first layer of the same cell did not noticeably change the electrical characteristics. The use of less chloride ion in the starting material seems to make the total cell more translucent and, therefore, the values for "front wall" and "back wall" radiation more nearly equal.

The optimum thickness of the CdS for the multiplayer cell has been determined to be 10 to 20 microns, which is an order of magnitude thinner than CdS layers of prior art photoconductors or photovoltaic cells. Thinner films are less sensitive, pin holes are difficult to avoid and it is difficult to control the diffusion of the copper oxide layer 32 into layer 30. Thicker layers up to 50 to 60 microns are operable but do not produce any significant increased output and are much more opaque and thus reduce the "backwall" photovoltage output.

Figure 7:
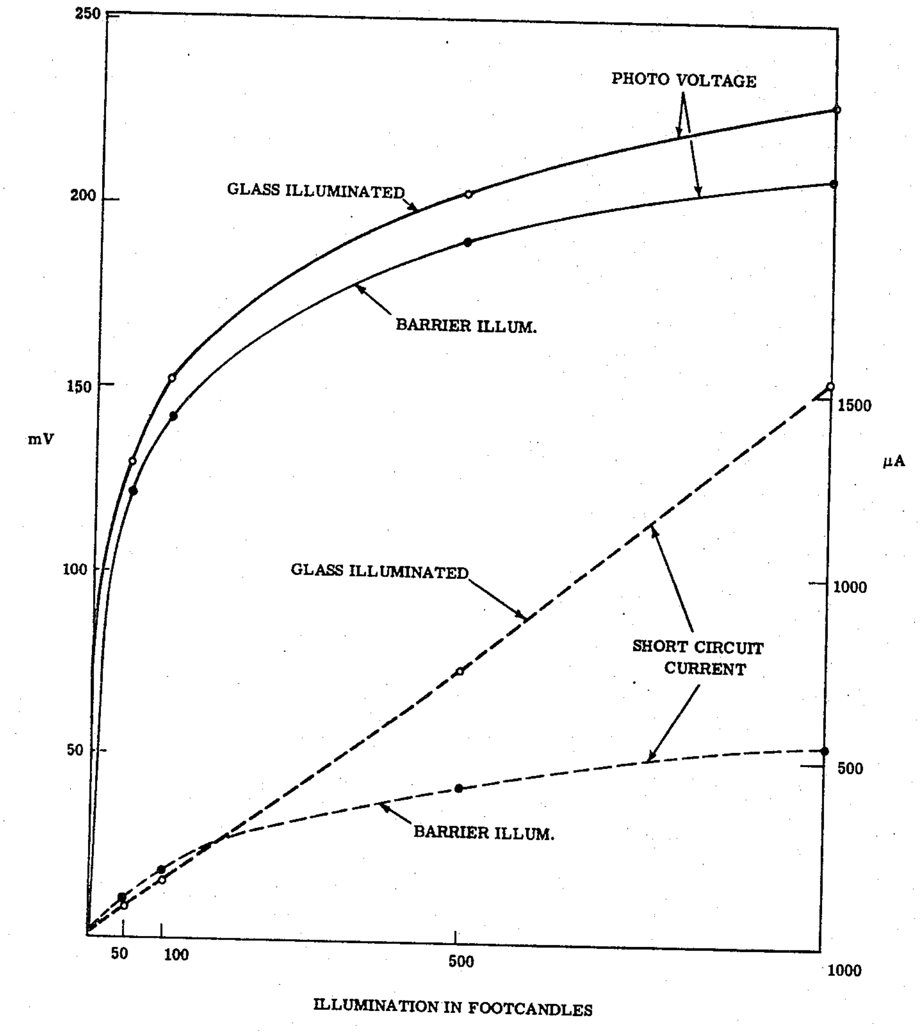
FIGURE 7 is a diagram illustrating the variation of photovoltage and photocurrent with varying light intensity for a typical photovoltaic cell as illustrated in FIGURE 4, separate curves illustrating the output when the cell is illuminated on the glass side (back wall) and when it is illuminated on the transparent barrier side (front wall).

Photovoltages up to 200 millivolts and higher were produced with a light source of roughly 500 footcandles. A slightly lower voltage output was generally obtained from illumination through electrode 30 ("front wall" illumination) as compared with "back wall" illumination through the glass substrate 16 as is apparent from the curves in FIGURE 7. However other cells were produced which showed superior photovoltage and short circuit current characteristics when barrier or "front wall" illumination was applied. The short circuit current increases linearly with light intensity up to about 1000 footcandles. The photovoltage does not increase linearly with increasing light intensity, but appears to level off with light intensity of about 1200 footcandles.

Figure 8:
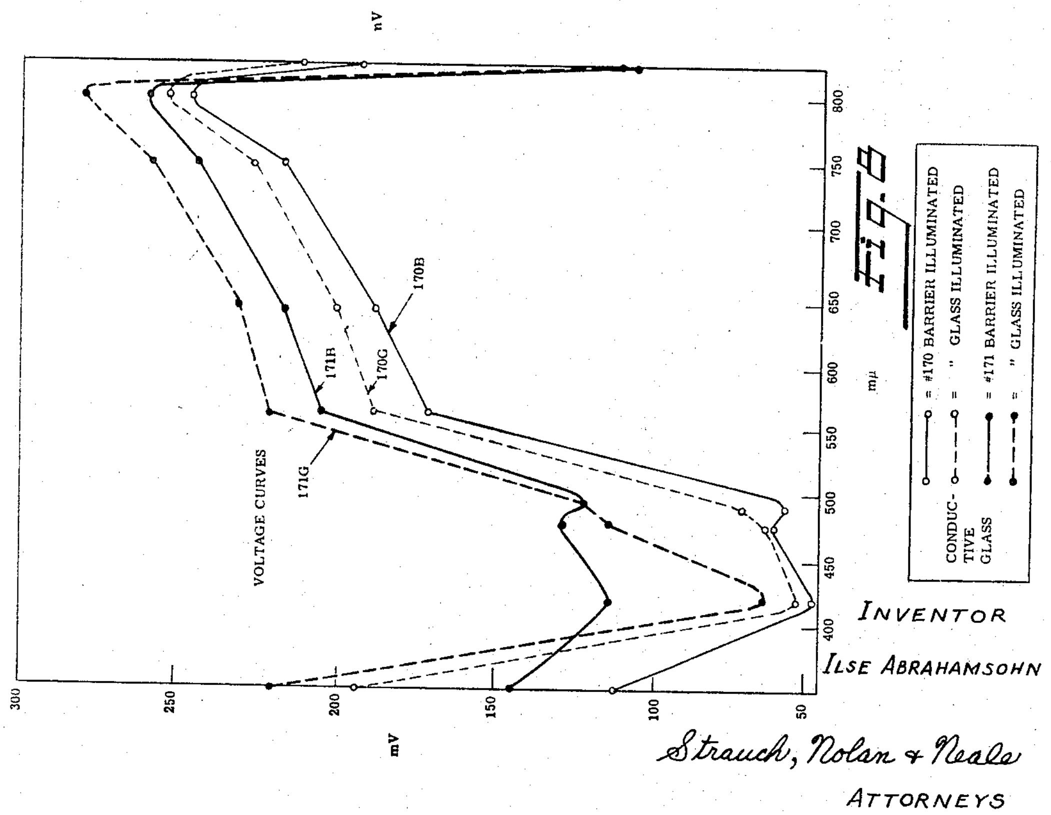
FIGURE 8 is a diagram illustrating the spectral response of two typical photovoltaic cells formed of translucent cadmium sulfide films in accordance with the present invention.

A representative spectral response of two cells in accordance with the present invention as illustrated in FIGURE 4 illuminated with a source of about 1000 footcandles is shown in FIGURE 8. The response in the shorter visible wavelengths up into the ultraviolet range seems significantly peculiar to certain embodiments of the activated CdS cell construction of the present invention as previously published spectral response curves for CdS show very little ultraviolet response. The absolute magnitude of photovoltage produced by the cell in responsive to ultraviolet radiation having wave lengths less than about 400 millimicrons (shown in FIGURES 7–9) was measured with a U.V. filter #7–54 which has a tail response in the 700–800 millimicron region and thus may indicate a somewhat larger photovoltage than is in fact produced. However, FIGURE 9 shows a marked superiority of photovoltage produced in response to ultraviolet radiation for activated cell #145 as compared with the photovoltage produced in response to the same radiation by an unactivated cell #126.

This ultraviolet response may result from the fact that two layers 18 and 20 are employed with layer 18 activated with copper as an acceptor impurity and layer 20 unactivated and containing only a $CdCl_2$ donor impurity. It is also possible that this response results from an excess of chlorine introduced by the impurities (i.e. $CdCl_2$ and $CuCl_2$) on the top surface of one or both of the CdS layers.

The total thickness of the CdS film and the amount and nature of donor and accetpor impurities introduced therein determine the spectral response and the "delta" of the cell. The donor impurity increases the cell conductivity and time constant by replacing a sulfide ion in the crystal lattice with a chloride ion. The acceptor impurity replaces cadmium ions in the lattice and shifts the spectral response towards the longer wave length portion of the spectrum. The acceptor impurity also reduces the light and dark current and time constant. Thus, it is necessary to provide a compromise ratio of donor impurity and acceptor impurity to obtain an optimum value of "delta."

FIGURE 9 shows the spectral response for typical cells of identical thickness, cell #145 having an acceptor impurity in layer 18 and cell #126 having no acceptor impurity in layer 18. Not only does cell #145 have a significantly greater ultraviolet response, but its response at the longer wave lengths is also somewhat better than the response of cell #126.

Although the mechanism of these photovoltaic cells is net fully understood, it appears that the nature of the effect may be that a p-n junction between n-type CdX and a p-type barrier. Or, it may be that because of the multilayer construction of the cell, photovoltages occur at the interfaces of the several layers. However, as pointed out above, if the barrier layer is omitted, only a very small photovoltaic effect is produced, while a single layer of CdS (FIGURE 5) is nearly as effective as the multiple layer (FIGURE 4).

Other types of photovoltaic cells composed of cadmium sulfide may be made photovoltaic by application of a transparent copper oxide barrier layer in accordance with the present invention. For example, a cadmium sulfide monocrystal may be used for the layer 34 of FIGURE 5. Similar cadmium sulfide monocrystals having a surface in contact with a layer of copper oxide are disclosed in FIGURE 7 of U.S. Patent No. 2,981,771 to Reynolds. However, this patent does not disclose how the cuprous oxide coating is applied to the surface of the cadmium sulfide crystals nor does it give any indication of the thickness of such copper oxide coating. However, subsequent experiments by those having knowledge of the work of Reynolds (which are reported in a paper entitled, "Evaporated CdS Film Photovoltaic Cells for Solar Energy Conversion,'" by A. E. Middleton, D. A. Gorske and F. A. Shirland presented at the American Rocket Society's Space Power Conference in September 1960) with photovoltaic cells of this type, involved electroplating copper at high current density on the bottom of the slab of cadmium sulfide crystals to produce a black mossy-like plating of very finely divided copper. This deposit was then oxidized by exposing it to air at 275° C. for about 10 seconds. Silver paint was then applied as a covering electrode. The oxidation treatment reportedly produced a darkening of the CdS back surface which decreased the light transmission through the crystal by ⅓ to ½ so that the cell could only be irradiated through the back surface (that is through the thickness of the cadmium sulfide crystal) rather than through the copper oxide layer.

The substantially transparent copper oxide layer utilized by this invention, coupled with a substantially transparent electrode 30 on the copper oxide layer surface, provides a photovoltaic cell that is both a "front wall" and a "back wall" type and it thus may be used in non-oriented solar cell systems. One major advantage of a cell so constructed is that only half the surface area required with prior photovoltaic cells is now necessary to produce the same power output when the cells are used in a non-oriented solar cell system such as exists in satellites. A solar cell system requiring only half the surface area of the prior art devices not only reduces the cost of the system, but its weight and thus the cost of placing it outside the gravitational field of the earth.

In the publication by Middleton et al., identified above, evaporated CdS film cells are described which were produced from a starting material composed of chips of monocrystals that had been grown by a crystal growing proces and appropriately doped to provide sensitized layers. The film thickness described was from 0.1 to 0.2 millimeter and copper was electroplated at high current density on the surface of the evaporated film and subsequently oxidized by exposure to air 275° C. for about 10 seconds, the same procedure previously used with monocrystals. Such cells have the same disadvantage as the monocrystal type cell in that they must be illuminated through the "back wall" (i.e. through the substrate and the evaporated CdS layer) since the copper oxide barrier layer is substantially opaque in contrast to the transparent thin film copper oxide layer of the present invention.

It is also possible to provide a body of sensitized cadmium sulfide in layer form by the sintering process commercially used to produce photoconductors. The cadmium sulfide in such cells is quite opaque, but such cells may be made photovoltaic by applying a thin copper layer to the CdS in accordance with the present invention, heating in an atmosphere containing oxygen at a temperature and for a time sufficient to oxidize the copper to form a copper oxide barrier layer, and then covering the copper oxide layer with a further substantially transparent electrode such as electrode 30 in FIGURE 3.

Referring now to FIGURE 10, a photosensitive device is illustrated which is composed of two photovoltaic cells 50 and 52 applied to opposite sides of a clear glass substrate 54. Commercially available conductive glass, i.e. glass with a thin oxide coating, transmits about 95% of the incident radiation impinging upon it. By contrast, a Pyrex substrate with closely spaced, gold, electrode feet as illustrated in FIGURE 1 may transmit about 75% of the incident radiation. With a single thin film of CdS as shown in FIGURE 5, or the double thin film of CdS as shown in FIGURE 4, a CdS film thickness of 10 to 20 microns may be effective in a photovoltaic cell. With lower concentrations of chloride ions present as an impurity in the starting material, a more nearly transparent CdS film is produced. As the barrier layer of copper oxide, being formed from a layer of copper only a few Angstrom units thick, is transparent and as electrode 30 may be made nearly as transparent as the tin oxide coating on the conductive glass, an entire photovoltaic cell may be produced which will transmit as much as 50% of the incident radiation. Thus, light may pass through one cell and through the clear glass substrate 54 into the other cell and cause a photovoltage to be produced from the cell on the side of substrate 54 remote from the source of radiation.

Summarizing the novel features and advantages of the novel thin film layer cell of the present invention, a starting material that may be used is powered cadmium sulfide or zinc sulfide which is available commercially in large quantities with controlled impurity additions. In comparison, the starting material heretofore employed was chips of single cadmium sulfide crystals that were produced in a monocrystal growing separate process. The present invention, therefore, thereby employs a simpler and less expensive starting material for the photovoltaic cell. As cadmium sulfide and zinc sulfide are so closely related chemically, both react the same manner to the various processes and their electrical characteristics are generally similar. Thus either of these semiconductor materials may be used interchangeably or together in mixtures as is well known by those skilled in this art. A photovoltaic layer produced in accordance with the present invention has excellent adhesion to smooth glass surfaces as well as to roughened plate surfaces. The use of transparent electrodes on both sides of the cells, coupled with a transparent barrier layer and the very thin translucent CdS film, provides a cell having a complete thickness on the order of 10 or 20 microns. This thickness permits irradiation of the cell from either side thus avoiding the orientation problem that existed with prior art cells which were exclusively "back wall" or "front wall" types. This construction makes it possible to stack two or more cells (as illustrated in FIGURE 10) where a strong light intensity is available so that radiation passing through one cell can impinge on another cell directly below it thus providing a means for greater utilization of impinging radiation. A further advantage of the photovoltac cell of the present invention resides in its sensitivity in the ultraviolet as well as in the far red portion of the spectrum.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a photosensitive cell comprising a pellucid conductive substrate and disposed thereon, a first and second separately sensitized, pellucid, photoconductor containing layer, each of said layers having a thickness of less than about 10 microns and each layer comprising the same photoconductor substance chosen from the group consisting of cadmium sulfide, zinc sulfide and mixtures thereof and a copper activator, the improvement wherein said second layer comprises an amount of copper activator substantially greater than the amount of copper activator in said first layer to provide ratio of the difference between the light current and the dark current to the dark current of the cell of at least about $10^7$.

2. The photosensitive cell of claim 1 wherein each layer comprises cadmium sulfide.

3. The photosensitive cell of claim 1 wherein each of said layers comprises zinc sulfide.

4. The photosensitive cell of claim 1 including a pellucid barrier layer of metal on the uppermost of said layers.

5. The photosensitive cell of claim 1 including a pellucid barrier layer of copper on the uppermost of said layers and an electrode superposed on said barrier layer.

References Cited

UNITED STATES PATENTS

| | | | |
|---|---|---|---|
| 2,305,576 | 12/1942 | Lamb | 136—89 |
| 2,414,233 | 1/1947 | Lidow | 136—89 |
| 2,688,564 | 9/1954 | Forgue. | |
| 2,757,104 | 7/1956 | Howes | 117—217 |
| 2,820,841 | 1/1958 | Carlson et al. | 136—89 |
| 2,844,640 | 7/1958 | Reynolds | 136—89 |
| 2,907,969 | 10/1959 | Seidensticker | 338—15 |
| 2,930,999 | 3/1960 | Van Santen et al. | 338—15 |
| 2,937,353 | 5/1960 | Wasserman | 338—15 |
| 2,949,498 | 8/1960 | Jackson | 136—89 |
| 2,997,677 | 8/1961 | Lubin | 338—15 |
| 2,999,240 | 9/1961 | Nicoll | 136—89 |
| 3,095,324 | 6/1963 | Cusano et al. | |
| 3,106,489 | 10/1963 | Lepsetter | 117—89 X |

ALLEN B. CURTIS, *Primary Examiner.*

JOHN H. MACK, RICHARD M. WOOD, *Examiners.*

J. H. BARNEY, H. T. POWELL, *Assistant Examiners.*